United States Patent [19]

Murohushi et al.

[11] Patent Number: 4,575,356
[45] Date of Patent: Mar. 11, 1986

[54] CONNECTION FOR FLEXIBLE CABLE AND SPEEDOMETER

[75] Inventors: Yoshiyuki Murohushi; Kiyomitsu Kato; Mineo Takahashi, all of Shizuoka, Japan

[73] Assignee: Yazaki Corporation, Tokyo, Japan

[21] Appl. No.: 688,288

[22] Filed: Jan. 7, 1985

Related U.S. Application Data

[63] Continuation of Ser. No. 377,699, May 12, 1982, abandoned.

[30] Foreign Application Priority Data

May 13, 1981 [JP] Japan .................. 56-70620

[51] Int. Cl.$^4$ .............................................. F16C 1/08
[52] U.S. Cl. ........................................ 464/52; 464/901
[58] Field of Search ...................... 403/13, 14, 334; 464/52, 170, 177, 182, 901

[56] References Cited

U.S. PATENT DOCUMENTS

| | | | |
|---|---|---|---|
| 2,992,715 | 7/1961 | Blachly | 464/901 X |
| 3,211,485 | 10/1965 | Petersen | 464/52 |
| 3,328,977 | 7/1967 | Wallis, Jr. | 464/52 X |
| 3,542,178 | 11/1970 | Ripple | 464/901 X |
| 3,602,009 | 8/1971 | Powell | 464/52 |
| 4,103,511 | 8/1978 | Kress et al. | 464/901 X |
| 4,280,338 | 7/1981 | Shannon et al. | 464/7 |

FOREIGN PATENT DOCUMENTS

| | | | |
|---|---|---|---|
| 787973 | 12/1957 | United Kingdom | 464/52 |
| 1395546 | 5/1975 | United Kingdom | 464/52 |
| 1441874 | 7/1976 | United Kingdom | 464/52 |

Primary Examiner—Stuart S. Levy
Assistant Examiner—Daniel P. Stodola

[57] ABSTRACT

A connection for a flexible cable and a speedometer. It comprises a connector engagable with a stem section of the speedometer and mounted on an end of the flexible cable, the flexible cable consisting of an outer tube and an inner tube, a rectangular elongate member having a conical tip and provided to the end of the inner shaft, a hollow rotatable shaft disposed in the stem section of the speedometer, said rotatable shaft being formed with a rectangular bore section in which the rectangular elongate member is engagable and stepped portions which are located in an inlet of said rectangular bore section and each provided with an inclined surface for guiding the elongate member.

8 Claims, 14 Drawing Figures

4,575,356

CONNECTION FOR FLEXIBLE CABLE AND SPEEDOMETER

This application is a continuation of application Ser. No. 377,699, filed May 12, 1982, now abandoned.

BACKGROUND OF THE INVENTION

The present invention relates to a connection between a speedometer mounted on a dash panel of a vehicle and a flexible cable adapted to transfer the rotation of a transmission to the speedometer.

A prior art connection of the type described is illustrated in FIGS. 1 and 2. As shown, the speedometer has a stem section 2 in which a rotary shaft 1 is fit while the flexible cable comprises an outer tube 3a and an inner shaft 3b surrounded by the outer tube 3a. A connecting member 4 is rigidly mounted on one end of the flexible cable 3 and coupled over the stem section 2 of the speedometer. The connector 4 is locked in position on the stem section 2 by the engagement of its locking pawl 4a in an annular recess or groove 2a formed in the stem section 2. The inner shaft 3b terminates at a quadrilateral end $3b_1$ which is received in a correspondingly shapted axial bore 1a of the shaft 1 to transmit its rotation to the shaft 1. Through a known mechanism, the rotation of the shaft 1 is transformed into reciprocal movement of a pointer on the speedometer to display the varying speed of the transmission.

However, the locking engagement of the connector 4 with the stem 2 cannot be set up unless the angular positions of the quadrilateral shaft end $3b_1$ and axial bore 1a are fully aligned axially to each other. Misalignment has to be compensated by turning the connector 4 on the flexible cable 3 in either direction. Such manual work must be performed in a very limited space behind the speedometer and, therefore, is quite troublesome.

A region adjacent the dash panel and behind the speedometer is jammed with various instruments. Manually connecting the flexible cable to the speedometer in such a region from behind the speedometer is not easy. This may be coped with by, as has recently been attemped, fixing the flexible cable 3 in a predetermined position behind the speedometer and then attaching the speedometer to the dash panel from before into connection with the flexible cable 3. However, should the quadrilaterals of the shaft end $3b_1$ and axial bore 1a be misaligned in the axial direction, great difficulty would be experienced in connecting them together since the speedometer could not be inclined to any extent for the alignment.

SUMMARY OF THE INVENTION

It is accordingly an object of the present invention to permit the flexible cable and speedometer to be readily engaged with each other merely by pushing the connector on the flexible cable onto the stem of the speedometer or the stem into the connector. In accordance with the present invention, a rectangular end of an inner shaft of a flexible cable is first introduced into a frustoconical inlet portion of a through bore formed in a rotary shaft of a stem section and, if the rectangular shaft end is axially mis aligned with a rectangular section of the bore which is contiguous with the inlet portion, the inner shaft is rotated into automatic alignment with the stem section as the flexible cable or the speedometer is pushed.

BRIEF DESCRIPTION OF THE DRAWINGS

These and other objects and advantages of the invention may be readily ascertained by referring to the following description and appended drawings in which:

FIG. 8b is a cross section of the oval elongated member of FIG. 8a;

DETAILED DESCRIPTION OF THE PREFERRED EMBODIMENTS

A preferred embodiment of the present invention will be described with reference to FIGS. 3-5.

Figure 1:
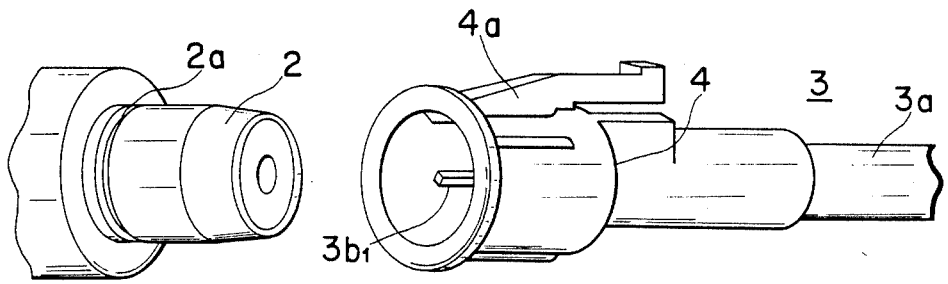
FIG. 1 is a perspective view of a prior art connection between a flexible cable and a speedometer shown in a separated condition.
Figure 2:
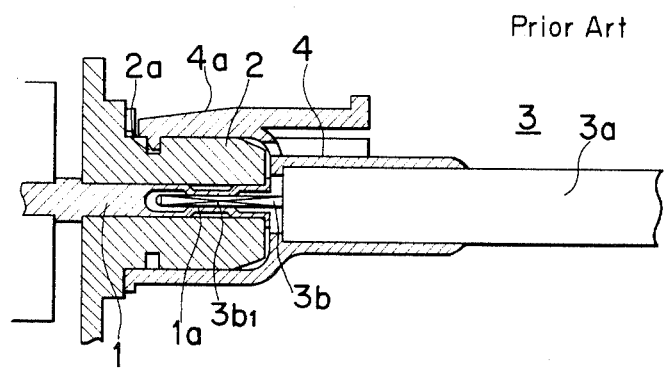
FIG. 2 is a section of the connection shown in FIG. 1.
Figure 3:
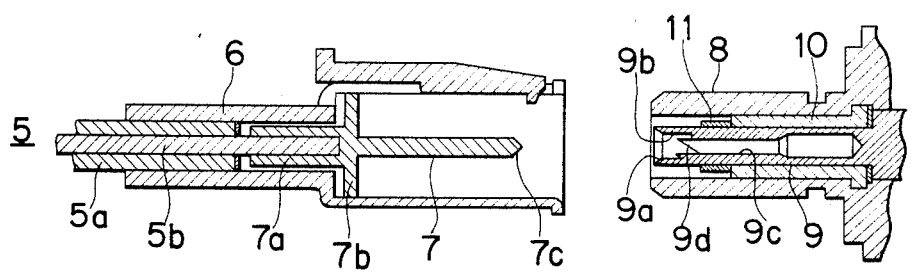
FIG. 3 is a section of a connection embodying the present invention and shown in a separated condition.
Figure 4:
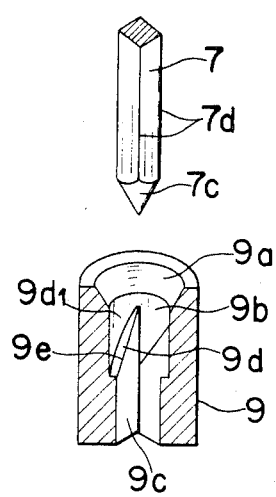
FIG. 4 is a fragmentary exploded perspective view of the connection shown in FIG. 3.
Figure 5:
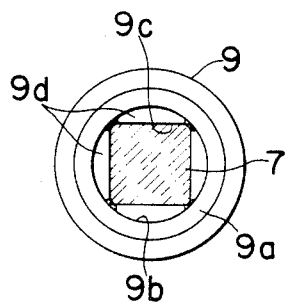
FIG. 5 is an end view of a hollow rotatable shaft included in the connection of FIG. 3.
Figure 7A:
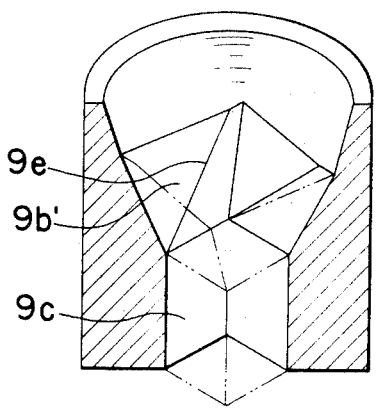
FIG. 7a is a partly fragmentary view of a further modification of the rotary shaft cut away to show a divergent inner walls continuous from the respective longitudinal inner walls of the engagement section of the through bore and cut away to form a single ridge.

Referring to FIGS. 3-5, a flexible cable 5 comprises an outer tube 5a formed of plastics and an inner shaft 5b rotatably passed through the outer tube 5a in the form of dense turns of a steel wire. Torque is thus transmitted from a torque take-out end of the transmission over to the tip of the inner shaft 5b.

A connector 6 made of plastics is rigidly fused onto the leading end of the outer tube 5a. Inside the connector 6, an elongate plastic key member 7 in the form of a prism having a square cross-section is rigidly and longitudinally coupled to the inner shaft 5b at its hollow axial extension 7a. Outer corners of the elongate key member 7 is designed to act as male engagement means. A flange 7b is formed integrally with and between the key 7 and its extension 7a so as to prevent oscillation of the key 7 in sliding contact with the inner wall of the connector 6. The end of the key 7 remote from the extension 7a is shaped into a conical guide 7c.

A stem section 8 extends from the back of a speedometer (not shown). As well known in the art, the speedometer has therein a rotary magnet, a speed cup, a pointer shaft, a hair spring, a dial and a pointer.

A cylindrical rotary shaft 9 is disposed inside the stem 8 and surrounded by a bearing 10 which is made of sintered metal. The shaft 9 is rigidly connected with the magnet of the speedometer. An annular collar 11 is fixed to the outer periphery of the shaft 9 to prevent it from slipping out of the bearing 10.

Preferably, the shaft 9 is made of plastics which is as hard as the key 7 though the use of metal is permissible.

The shaft 9 is formed with a through axial bore which comprises a frustoconical inlet portion 9a tapered axially inwardly from one end of the shaft 9, a cylindrical receiving section 9b having a cylindrical inner wall contiguous with the inlet portion 9a and slightly larger in diameter than the circumscribed circle of the elongate square key member 7 to facilitate its insertion therein, and a square engagement section 9c defined by four longitudinal flat inner walls coaxially extending from the cylindrical receiving section 9b toward the other end of the shaft 9.

From said respective flat inner walls, there are projecting four extentions 9c' into the cylindrical receiving section defined by the cylindrical inner wall. Each extension is partially cut away to form a shoulder 9d having a surface 9d' inclined toward one of the four inner corners each defined by two adjoining inner walls of the square engagement section 9c. Said inner corners are designed as female engagement means. Said inclined surface 9d' defines a receiving space 9d$_1$ in cooperation with said cylindrical inner wall. Further, each flat inner wall and the inclined surface of each shoulder form a ridge extending longitudinally at an angle toward the corner defined by two adjoining inner walls. The receiving space 9d$_1$ is enlarged as compared to the inner size of the square engagement section 9c to an extend sufficient to receive the elongate key member 7 even if the square cross section of the key member 7 and the engagement section 9c face each other in a angularly misaligned condition by 45 degrees. Needless to say, said engagement section 9c is sized to provide a sliding fit of the elongate key member therewithin.

In the illustrated embodiment, the shoulder 9d are in the form of the inner walls of the square engagement section 9c in the receiving space 9d$_1$. Alternatively, however, the inner wall of the cylindrical section 9b may be locally projected radially inward to form an inclined shoulders independently of the inner walls of the square engagement section as long as ridges are formed to extend toward any of the four conners of the square engagement section.

Now, let it be supposed that the connector 6 is to be coupled over the stem 8 of the speedometer which has been fixed in place on the dash panel. The conical guide end 7c of the key 7 is introduced into the cylindrical receiving section 9b of the shaft 9 guided by the frustoconical inlet portion 9a. As the connector 6 is further pushed onto the stem 8, the key 7 becomes engaged in the square section 9c of the shaft bore if the squares of the key 7 and engagement section 9c are in alignment. If they are out of alignment, the corners 7d of the key 7 will abut against the shoulders 9d having the inclined surfaces on entering the receiving space 9d$_1$ of the engagement section 9c. The key 7 then automatically causes the shaft 9 to turn through a small angular distance until the cross-sections of the key 7 and engagement section 9c become axially aligned with each other. Further pushing the connector 6 will allow the key member 7 to be fully received in the engagement section 9c as under the complete alignment. Afterwards, the connector 6 is locked to the stem 8 of the speedometer by suitable fastening means as usual.

Suppose the contrary situation wherein the connector 6 on the flexible cable 5 is fixed in advance to the vehicle body and the speedometer or its stem 8 is to be coupled with the connector 6 from inside the vehicle cabin. Under this condition, the key 7 is loaded too much by the inner shaft 5a, gear reduction of the transmission and the like to be rotatable. Hence, the hollow shaft 9 will be turned by the key 7 for automatic positioning when its engagement section 9c is out of alignment with the key 7.

It will be understood in the second situation that the locking means between the stem 8 and the connector 6 is omissible inasmuch as the speedometer is fixed to the dash panel and the connector 6 to the vehicle body.

Figure 6A:
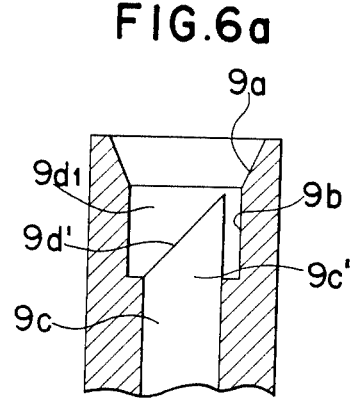
FIGS. 6a is a vertical cross section of the rotary shaft of FIGS. 3 to 5.
Figure 6B:
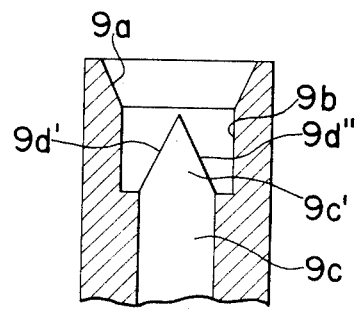
FIG. 6b is a vertical cross section of another modification of the rotary shaft of the invention.

FIG. 6a shows a vertical cross section of the embodiment of FIG. 4 and FIG. 5. The extension 9c' of the longitudinal flat inner wall 9c is cut away such that a single inclined surface 9d' is formed. The extension 9c' may be, however, cut away such that a pair of inclined surfaces are formed as shown in FIG. 6b as long as the inclined surfaces 9d'' and the ridges associated therewith are designed to intersect each other and extend longitudinally at an angle toward adjoining two corners of the engagement section.

Figure 7B:
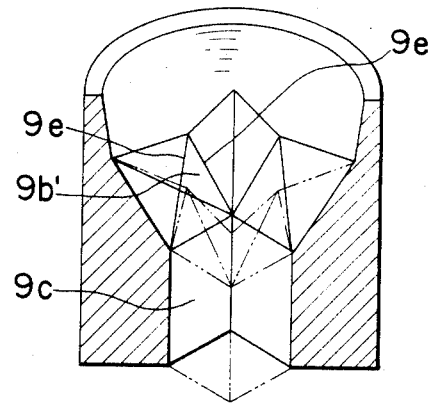
FIG. 7b is a similar fragmentary view of a still further modification of the rotary shaft showing divergent inner walls but illustrates a pair of ridges formed by cutting away of the divergent inner wall.

In the above mentioned embodiments, the receiving section is designed as a cylindrical inner wall 9b forming receiving space into which cut-away extensions of the inner walls project. However, the receiving section may be embodied in the form of four divergent flat inner walls 9b' continuous from the respective longitudinal inner walls 9c. In this embodiment, ridge 9e is formed by cutting away at least one of the divergent inner walls to extend longitudinally at an angle toward one of the inner corners. Here again, a pair of ridges may be formed in the divergent inner walls as shown in FIG. 7b.

Figure 8A:
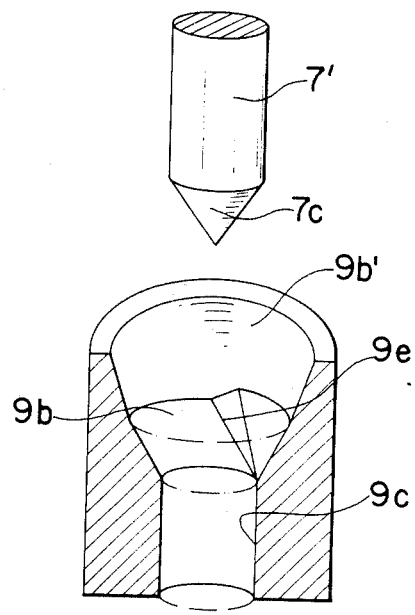
FIG. 8a is a fragmentary exploded perspective view of another embodiment of the connection in a separated condition.
Figure 8B:
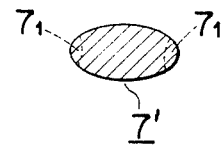

FIG. 8a shows a further embodiment of the invention. The elongate key member 71 may be oval in cross section as shown in FIG. 8b in which long radius portions 7$_1$ in cross section thereof act as male engagement means. On the rotary shaft side, receiving section is a single divergent wall, oval in cross section and the engagement section is defined by a longitudinal oval wall. Said divergent inner wall is cut away to form a ridge 9e extending longitudinally at an angle toward one of the two long radius portions of the longitudinal oval inner wall.

Figure 9:
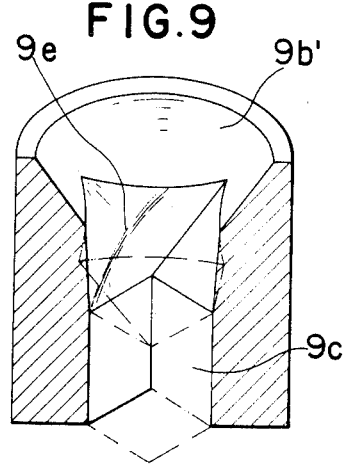
FIG. 9 is perspective view of a further embodiment of the present invention.

Referring to FIG. 9, rotary shaft 9 is formed with a further modified longitudinal through bore comprised of square engagement section defined by engagement inner walls 9c into which an elongate prism key member (not shown) slidingly fits. A receiving and guiding section is formed by four divergent inner walls continuous from respective longitudinal inner walls. Said divergent inner walls are twisted relative to the respective longitudinal inner walls to form ridges 9e therein such that the outer corners of the elongate key member are guided toward the inner corners in case where the elongate member is inserted into the longitudinal through bore at a misaligned angle.

In the fore-mentioned embodiments, ridge 9e acts to guide the outer corners or long radius portions of the elongate member into the inner corners or long radius portions of the engagement sections of the through bore even if the elongate member is inserted into the through bore at a misaligned angle.

Figure 10A:
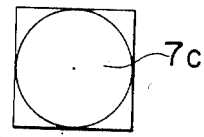
FIGS. 10a and 10b are end views of the elongate member in various modifications.
Figure 10B:
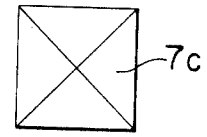

Although the elongate member terminates in a cone on a speedometer side thereof as shown in FIG. 10a which illustrates an end view of the elongate prism member 7, it may terminate in a pyramid as shown in FIG. 10b which also shows an end view of the elongate prism member.

In summary, it will be seen that the present invention promotes single-manipulation, ready and quick connection of a flexible cable and a speedometer without resort to any additional manual work for adjustment even if rectangular cross-sections of a key or like elongate member at the end of the flexible cable and a bore in a rotatable shaft of the speedometer are misaligned. Under the misalignment, the corners of the rectangular elongate member would abut against inclined shoulders within the bore to automatically rotate the shaft until the rectangular cross-sections become fully aligned.

What is claimed is:

1. A connection for an axially rotating flexible cable and a speedometer comprising:

an elongate prism member longitudinally extending from an axially rotating flexible cable, and having outer corners therearound, and an end defined by a conical surface;

a rotary shaft to transmit axial rotation of said flexible cable to a speedometer stem section, said rotary shaft being formed with a longitudinal through bore, said bore having an engagement section defined by flat engagement inner walls meeting each other to form inner corners and a receiving section defined by receiving inner wall means continuous from said flat engagement inner walls to facilitate insertion of said elongate member from outside the through bore, said engagement section being sized to provide a sliding fit of the elongate member therewithin, said receiving inner wall means including divergent flat inner walls continuous from the respective flat engagement inner walls, and guide means formed in the receiving section of the longitudinal through bore for guiding said outer corners of the elongate prism member toward said inner corners in case where said elongate prism member is inserted into the longitudinal through bore of the rotary shaft at a misaligned angle, said guide means having ridge means extending toward at least one of said inner corners at angle relative to a longitudinal direction, said ridge means being formed by cutting away at least one of the divergent inner walls, said conical surface of the elongate member being adapted to contact said ridge means.

2. A connection according to claim 1, wherein said guide means includes at least one extension of said flat engagement inner walls, said extension projecting into the receiving inner wall means and being cut away to form a shoulder having a surface inclined toward one of the inner corners of the engagement section.

3. A connection according to claim 1, wherein said receiving inner wall means includes a cylindrical inner wall.

4. A connection according to claim 3, wherein said ridge means includes a ridge defined by the inclined surface and the extension.

5. A connection according to claim 1, wherein said guide means includes at least one extension of said flat engagement inner walls, said extension projecting into the receiving inner wall means and being cut away to form a pair of shoulders each having a surface inclined toward one of the inner corners of the engagement section.

6. A connection according to claim 1, wherein said ridge means includes two ridges each defined by the inclined surface and the extension, and intersecting each other and extending longitudinally at an angle toward two respective adjoining inner corners.

7. A connection according to claim 1, wherein said ridge means includes a ridge extending longitudinally at an angle toward one of the inner corners.

8. A connection according to claim 1, wherein said ridge means includes two ridges extending longitudinally at an angle toward two respective adjoining inner corners.

* * * * *